(12) United States Patent
Gruzdev et al.

(10) Patent No.: US 6,868,179 B2
(45) Date of Patent: Mar. 15, 2005

(54) AUTOMATIC SATURATION ADJUSTMENT

(75) Inventors: Pavel Vladimirovich Gruzdev, St. Petersburg (RU); Kryzstof Antoni Zaklika, St. Paul, MN (US)

(73) Assignee: Jasc Software, Inc., Eden Prairie, MN (US)

( * ) Notice: Subject to any disclaimer, the term of this patent is extended or adjusted under 35 U.S.C. 154(b) by 577 days.

(21) Appl. No.: 09/900,441

(22) Filed: Jul. 6, 2001

(65) Prior Publication Data

US 2003/0012433 A1 Jan. 16, 2003

(51) Int. Cl.$^7$ .......................... G06K 9/00; H04N 1/419
(52) U.S. Cl. ........................ 382/167; 358/3.23
(58) Field of Search .................. 358/1.9, 3.23, 358/500, 501, 518, 520, 522, 523; 382/162, 165, 172, 167, 168; 348/650

(56) References Cited

U.S. PATENT DOCUMENTS

| | | | |
|---|---|---|---|
| 4,812,902 A | | 3/1989 | Fuchsberger ................. 358/80 |
| 5,010,398 A | * | 4/1991 | Nys et al. .................... 358/517 |
| 5,172,224 A | * | 12/1992 | Collette et al. ............. 358/515 |
| 5,390,034 A | | 2/1995 | Murakami et al. .......... 358/518 |
| 5,450,217 A | | 9/1995 | Eschbach et al. ........... 358/518 |
| 5,517,335 A | | 5/1996 | Shu ............................ 358/518 |
| 5,717,839 A | * | 2/1998 | Ichikawa ...................... 358/1.9 |
| 5,745,263 A | * | 4/1998 | Oryo .......................... 358/518 |
| 5,790,282 A | | 8/1998 | Hayashi et al. ............. 358/520 |
| 5,966,222 A | * | 10/1999 | Hirata et al. ................ 358/520 |
| 5,982,926 A | | 11/1999 | Kuo et al. ................... 382/167 |
| 6,101,271 A | * | 8/2000 | Yamashita et al. .......... 382/167 |
| 6,160,912 A | * | 12/2000 | Usami ........................ 382/167 |
| 6,476,877 B2 | * | 11/2002 | Kihara et al. ............... 348/650 |
| 6,674,485 B2 | * | 1/2004 | Akiyama et al. ........... 348/586 |

FOREIGN PATENT DOCUMENTS

| | | | |
|---|---|---|---|
| EP | 1 017 241 A2 | 7/2000 | ............ H04N/9/64 |
| WO | WO 97/01151 | 1/1997 | ............ G06T/5/00 |

OTHER PUBLICATIONS

Inoue, A., et al., "Adaptive Quality Improvement Method for Color Images," *NEC Res. Dev.*, vol. 35, 1994; 180–187.

Nayatani, Y., "Revision of the Chroma and Hue Scales of a Nonlinear color–Appearance Model," *Color Research and Application* vol. 20(3), Jun. 1995; 143–155.

Hunt, R. W. G., "An Improved Predictor of Colourfulness in a Model of Colour Vision," *Color Research and Application* vol. 19(1) Feb. 1994; 23–26.

Luo, M. R., "The LLAB Model for Colour Appearance and Colour Difference Evaluation," *SPIE* vol. 2658, 1996; 261–269.

Fairchild, M. D., "Refinement of the RLAB Color Space," *Color Research and Application*, vol. 21(5) Oct. 1996; 338–346.

Fairchild, M. D., et al., "The CIE 1997 Interim Colour Appearance Model (Simple Version), CIECAM97s" *CIE TC1–34* Apr. 1998; 1–21.

(List continued on next page.)

*Primary Examiner*—Andrew W. Johns
*Assistant Examiner*—Amir Alavi
(74) *Attorney, Agent, or Firm*—Hensley Kim & Edgington, LLC

(57) ABSTRACT

A method of correcting image saturation is performed by defining saturated colors in a chromaticity color space; and deriving an overall correction of the saturation of colors in the image using the defined saturation of these colors in conjunction with a table of corrections indexed by hue and lightness. This process has a unique attribute of being able to automatically decrease saturation in regions of an image where oversaturation is detected.

28 Claims, 3 Drawing Sheets

OTHER PUBLICATIONS

Ebner, F., et al., "Development and Testing of a Color Space (IPT) with Improved Hue Uniformity," *The Sixth Color Imaging Conference: Color Science, Systems and Applications* 1998; 8–13.

Guth, S. L., "Further Applications of the ATD Model for Color Vision," Proc. *SPIE* vol. 2414, 1995; 12–26.

Zhang, X., et al., "A Spatial Extensions of CIELAB for Digital Color–Image Reproduction," *Journal of SID* vol. 5(1) 1997; 61–63.

Berns, R. S., et al., "Determination of Constant Hue Loci for a CRT Gamut and Their Predictions Using Color Appearance Spaces," *Color Research and Application* vol. 20(291) 1995; 163.

Hung, P. C., et al., "Determination of a Constant Hue Loci for a CRT Gamut and Their Predictions Using Color Appearance Spaces," *Color Research and Application* vol. 20(5) Oct. 1995; 285–295.

Hamie, A. A., et al., "The British Building Colour Standards: Conversion to the Notations of Munsell, NCS, DIN, Coloroid, Colorcurve, and OSA–UCS," *Color Research and Applications* vol. 20(5) Oct. 1995; 328–340.

MacAdam, D. L., "Uniform Color Scales," *Journal of the Optical Society of America* vol. 64(12) Dec. 1974; 1691–1702.

The Swedish Natural Color System, "The NCS is as Simple as This!" http://www.ncscolour.com.

Richter, M., et al., "The Story of the DIN Color System," *Color Research and Application* vol. 11(2) Summer 1986; 138–145.

Smith, A. R., "Color Gamut Transform Pairs," *Computer Graphics* vol. 12(3) Aug. 1978; 12–19.

Nadenau, M. "Integration of Human Color Vision Models into High Quality Image Compression," Thesis No. 2296 htpp://ltswww.epfl.ch/pub_files/nadenau// Départment D'Electricité, Ecole Polytechnque Fédérale de Lusanne, Switzerland 2000.

* cited by examiner

Figure 2

| Lightness L* | \multicolumn{18}{c}{Hue, H° (degrees)} |
|---|---|---|---|---|---|---|---|---|---|---|---|---|---|---|---|---|---|---|
| | 0±10 | 20±10 | 40±10 | 60±10 | 80±10 | 100±10 | 120±10 | 140±10 | 160±10 | 180±10 | 200±10 | 220±10 | 240±10 | 260±10 | 280±10 | 300±10 | 320±10 | 340±10 |
| 0-3 | 11.20 | 15.00 | 10.00 | 4.36 | 3.67 | 3.64 | 4.24 | 5.89 | 5.12 | 3.36 | 3.06 | 3.13 | 4.18 | 6.62 | 15.10 | 15.00 | 20.61 | 13.75 |
| 4-7 | 17.76 | 23.00 | 18.00 | 9.12 | 7.30 | 7.27 | 8.83 | 11.56 | 10.12 | 6.91 | 6.11 | 6.13 | 7.39 | 9.93 | 17.67 | 25.00 | 33.10 | 20.92 |
| 8-11 | 20.69 | 30.00 | 25.00 | 13.61 | 11.30 | 11.10 | 13.30 | 16.80 | 13.97 | 9.72 | 8.17 | 7.74 | 8.82 | 11.85 | 25.00 | 40.00 | 39.00 | 24.64 |
| 12-15 | 23.56 | 35.00 | 34.00 | 18.50 | 14.86 | 14.60 | 25.00 | 28.00 | 16.00 | 11.35 | 9.23 | 8.78 | 10.19 | 13.37 | 32.00 | 47.00 | 44.80 | 27.96 |
| 16-19 | 26.53 | 40.00 | 45.00 | 25.00 | 18.14 | 22.00 | 30.00 | 32.00 | 17.95 | 12.77 | 10.30 | 9.83 | 11.42 | 15.10 | 37.00 | 52.00 | 50.10 | 31.80 |
| 20-23 | 29.57 | 45.00 | 53.00 | 30.00 | 25.00 | 28.00 | 35.00 | 38.00 | 19.81 | 13.90 | 11.50 | 10.96 | 12.67 | 18.00 | 43.00 | 55.00 | 50.00 | 35.18 |
| 24-27 | 32.44 | 47.00 | 60.00 | 35.00 | 27.00 | 32.00 | 40.00 | 42.00 | 21.98 | 15.68 | 12.80 | 12.10 | 13.91 | 20.00 | 48.00 | 55.00 | 55.00 | 38.60 |
| 28-31 | 35.33 | 50.00 | 67.03 | 37.00 | 30.00 | 35.00 | 45.00 | 45.00 | 24.06 | 17.05 | 15.00 | 13.10 | 15.33 | 24.00 | 50.00 | 55.00 | 60.00 | 42.52 |
| 32-35 | 38.30 | 55.00 | 74.00 | 40.00 | 35.00 | 40.00 | 47.00 | 48.00 | 25.84 | 18.44 | 18.00 | 17.00 | 16.50 | 26.00 | 52.00 | 60.00 | 65.00 | 45.80 |
| 36-39 | 41.30 | 60.00 | 77.00 | 45.00 | 40.00 | 40.00 | 52.00 | 52.00 | 27.80 | 19.87 | 20.00 | 20.00 | 19.00 | 28.00 | 52.00 | 60.00 | 65.00 | 49.45 |
| 40-43 | 44.30 | 65.00 | 80.00 | 50.00 | 45.00 | 45.00 | 54.00 | 55.00 | 29.81 | 21.17 | 23.00 | 22.00 | 22.00 | 30.00 | 52.00 | 60.00 | 64.00 | 53.01 |
| 44-47 | 47.30 | 65.00 | 75.00 | 55.00 | 50.00 | 50.00 | 55.00 | 60.00 | 32.01 | 22.57 | 25.00 | 22.00 | 22.00 | 32.00 | 52.00 | 60.00 | 60.00 | 56.50 |
| 48-51 | 50.20 | 65.00 | 75.00 | 60.00 | 50.00 | 50.00 | 56.00 | 60.00 | 33.91 | 24.15 | 27.00 | 25.00 | 25.00 | 34.00 | 52.00 | 60.00 | 60.00 | 60.07 |
| 52-55 | 53.20 | 66.00 | 78.00 | 65.00 | 55.00 | 55.00 | 60.00 | 55.00 | 36.10 | 25.48 | 30.00 | 25.00 | 27.00 | 36.00 | 55.00 | 59.50 | 60.00 | 63.60 |
| 56-59 | 53.30 | 63.00 | 70.00 | 65.00 | 63.00 | 60.00 | 63.00 | 55.00 | 37.93 | 26.84 | 30.00 | 30.00 | 30.00 | 40.00 | 55.00 | 53.30 | 60.00 | 67.05 |
| 60-63 | 46.99 | 63.00 | 70.00 | 65.00 | 67.00 | 65.00 | 67.00 | 58.00 | 39.98 | 28.41 | 33.00 | 30.00 | 30.00 | 40.00 | 55.00 | 48.30 | 60.00 | 64.14 |
| 64-67 | 41.36 | 58.00 | 65.00 | 63.00 | 70.00 | 70.00 | 70.00 | 64.00 | 42.06 | 29.74 | 34.00 | 30.00 | 30.00 | 40.00 | 50.00 | 43.34 | 55.00 | 58.11 |
| 68-71 | 35.61 | 50.00 | 55.00 | 63.00 | 70.00 | 70.00 | 70.00 | 70.00 | 44.07 | 31.24 | 35.00 | 30.00 | 33.00 | 38.00 | 40.00 | 38.33 | 50.00 | 50.12 |
| 72-75 | 30.25 | 40.00 | 50.00 | 62.00 | 75.00 | 75.00 | 72.00 | 72.00 | 46.09 | 32.51 | 36.00 | 30.00 | 30.00 | 36.00 | 35.00 | 33.39 | 46.40 | 42.46 |
| 76-79 | 25.29 | 35.00 | 40.00 | 60.00 | 75.00 | 77.00 | 74.00 | 75.00 | 48.05 | 34.06 | 38.00 | 30.00 | 30.00 | 35.00 | 28.00 | 28.14 | 39.30 | 35.74 |
| 80-83 | 20.61 | 23.00 | 30.00 | 47.00 | 75.00 | 78.00 | 74.00 | 78.00 | 50.01 | 35.60 | 38.00 | 30.00 | 27.00 | 30.00 | 19.40 | 23.31 | 32.03 | 29.09 |
| 84-87 | 16.05 | 16.00 | 22.00 | 35.00 | 70.00 | 80.00 | 74.00 | 80.00 | 52.22 | 37.05 | 40.00 | 30.00 | 25.00 | 25.00 | 15.17 | 19.56 | 25.40 | 22.30 |
| 88-91 | 11.53 | 10.10 | 11.40 | 25.99 | 59.60 | 80.00 | 74.00 | 80.00 | 52.29 | 37.64 | 40.00 | 28.00 | 14.20 | 15.00 | 11.30 | 13.86 | 18.72 | 16.45 |
| 92-95 | 7.43 | 6.49 | 7.21 | 9.40 | 28.00 | 85.00 | 74.00 | 60.00 | 33.05 | 27.58 | 30.00 | 20.00 | 9.27 | 7.60 | 7.54 | 8.95 | 12.05 | 10.62 |
| 96-100 | 3.45 | 3.13 | 3.27 | 4.41 | 8.30 | 80.00 | 60.00 | 21.60 | 14.94 | 12.48 | 12.10 | 7.17 | 4.58 | 3.78 | 3.61 | 4.42 | 5.80 | 5.09 |

Figure 3

| Lightness | Hue, H* (degrees) | | |
|---|---|---|---|
| L* | 20±10 | 40±10 | 60±10 |
| 0- 3 | 15.00 | 10.00 | 4.36 |
| 4- 7 | 23.00 | 18.00 | 9.12 |
| 8-11 | 30.00 | 25.00 | 13.61 |
| 12-15 | 35.00 | 34.00 | 18.52 |
| 16-19 | 35.00 | 40.00 | 22.86 |
| 20-23 | 35.00 | 40.00 | 26.84 |
| 24-27 | 35.00 | 40.00 | 30.80 |
| 28-31 | 35.00 | 40.00 | 34.30 |
| 32-35 | 35.00 | 40.00 | 40.00 |
| 36-39 | 35.00 | 40.00 | 43.00 |
| 40-43 | 35.00 | 40.00 | 43.00 |
| 44-47 | 35.00 | 41.00 | 44.00 |
| 48-51 | 35.00 | 41.00 | 45.00 |
| 52-55 | 35.00 | 43.00 | 45.00 |
| 56-59 | 35.00 | 43.00 | 45.00 |
| 60-63 | 35.00 | 43.00 | 45.00 |
| 64-67 | 35.00 | 40.00 | 44.00 |
| 68-71 | 32.00 | 36.00 | 44.00 |
| 72-75 | 32.00 | 36.00 | 43.00 |
| 76-79 | 30.00 | 30.00 | 40.20 |
| 80-83 | 23.00 | 30.00 | 30.80 |
| 84-87 | 16.00 | 20.00 | 22.50 |
| 88-91 | 10.13 | 15.00 | 15.59 |
| 92-95 | 6.49 | 7.30 | 9.57 |
| 96-100 | 3.13 | 3.27 | 4.41 |

AUTOMATIC SATURATION ADJUSTMENT

BACKGROUND OF THE INVENTION

1. Field of the Invention

The present invention relates to the field of imaging, particularly digital imaging, color digital imaging, the adjustment of digital imaging data, and automatic correction of saturation in color digital imaging data.

2. Background of the Art

With the proliferation of equipment such as digital cameras, scanners and computers digital imagery has become ubiquitous. The world wide web has also contributed its share of digital imagery. Frequently, whether because of limitations of technology or of skill, images are of less than optimal quality. While an expert may have the skill and talent to adjust and correct such images, a consumer without training in the image processing art finds it more difficult. Such a person could benefit from automated means of image quality improvement. Even the expert can benefit from such means since they can be a way of saving time. Among the image properties requiring correction is saturation. A properly saturated image has vibrant or vivid colors, which, however, maintain a natural look. Though it is perhaps more common to encounter undersaturated images, oversaturated images occur with some frequency. Most usually, the latter are the result of misapplied corrections performed with image editing software. Any automated method of image saturation adjustment must, therefore, cope with both oversaturated and undersaturated images. At present, no such method is available.

European. Pat. 1 017 241, and the references disclosed therein, describes a method of correcting image saturation following a change in the image tone curve (i.e. image contrast). However, the disclosure is concerned with restoring the saturation to an appearance similar to that prior to the change in contrast, rather than with improvement of the saturation. U.S. Pat. No. 5,982,926 discloses, along with other operations, the transformation of image chrominance to correspond to the entire dynamic range of chrominance values. This process cannot correct oversaturated images and, indeed, may oversaturate well adjusted images. U.S. Pat. No. 4,812,902 describes a method of increasing chrominance using a non-linear characteristic curve, which has as its objective an increase in the saturation of low-saturation pixels without an increase in the saturation of highly saturated pixels. Such a process cannot reduce image saturation and, by boosting the saturation of areas of low chrominance, can contribute to a perception of color imbalance. This problem is addressed in U.S. Pat. No. 5,390,034, which accomplishes chroma correction by taking into account both luminance and chrominance to determine correction parameters. The parameters are chosen to increase chrominance where it is high and to leave regions of low chrominance and luminance unchanged, or even to force their complete desaturation. This recipe does not allow image saturation as a whole to be lowered. U.S. Pat. No. 5,517,335 describes a method of increasing saturation of halftone images by removing an increment from the least intense primary color and adding it to the most intense primary color. Again, such a procedure can only increase the saturation of an image though the changes do not correspond well to human perception of saturation. A very similar process is described in U.S. Pat. No. 5,790,282, wherein the color increment can be of both positive and negative sign, so permitting desaturation. However, this patent does not teach any means of automatically adjusting saturation. A method of automatic saturation adjustment is described in a paper entitled "Adaptive Quality Improvement Method for Color Images" (A. Inoue and J. Tajima, *NEC Res. Dev.*, 35, 180 (1994)). Here, the saturation of all image pixels in the HSV (hue-saturation-value) color space is linearly stretched such that the most saturated pixel acquires the maximum saturation it is possible to display in this space. This approach can only increase saturation and is, moreover, not robust since the adjustment depends on the saturation of but a single pixel, which may be subject to noise. U.S. Pat. No. 5,450,217 describes a more reliable and sophisticated variant of this type of correction that is based on an average saturation within certain value (i.e., lightness) bounds and compensation of image luminance for a change induced by the correction of saturation in the HSV color space. If the average saturation is less than a target value it is increased, otherwise it is left unchanged. Accordingly, this method does not provide a means of reducing excessive saturation. WO 97/01151 claims a "procedure for automatically maximizing the visual quality of an image in electric format, characterized in that the following operations are performed automatically: the image is converted into a chromaticity coordinate format; the probable grayness balance is determined for the image by a statistical method from the video signal and the grayness balance of the image is adjusted to correct it; the color reproduction of the image is adjusted; and the maximized image is converted to from the chromaticity coordinate format back to its original format". While the Lsα chromaticity space discussed in the patent includes a saturation coordinate, s, no explicit mention is made of saturation adjustment. Moreover, the patent does not disclose any specific embodiment of the invention that would enable the adjustment of "colour reproduction".

Accordingly, there remains a need for a method of automatically adjusting the saturation of an image that will reliably provide an desirable saturation whether the initial image is oversaturated or undersaturated.

SUMMARY OF THE INVENTION

It is, therefore, an aspect of this invention to provide a means of automatically and appropriately adjusting the saturation of digital images, no matter whether the saturation is initially too low or too high, or initially correct and, therefore, requiring the existing saturation to be preserved.

This and other aspects of the invention are achieved by defining a range of highly saturated colors in a chromaticity color space and using the saturation of these colors, in conjunction with a table of corrections indexed by hue and lightness, to derive an overall correction for the saturation of colors in the image.

BRIEF DESCRIPTION OF THE FIGURES

FIG. 2 is a first table relating values of lightness and hue that may be used in conjunction with a process according to the present invention, the values being representative, not necessarily absolute.

FIG. 3 is a second table relating values of lightness and hue that may be used in conjunction with a process according to the present invention, the values being representative, not necessarily absolute.

DETAILED DESCRIPTION OF THE INVENTION

Figure 1:
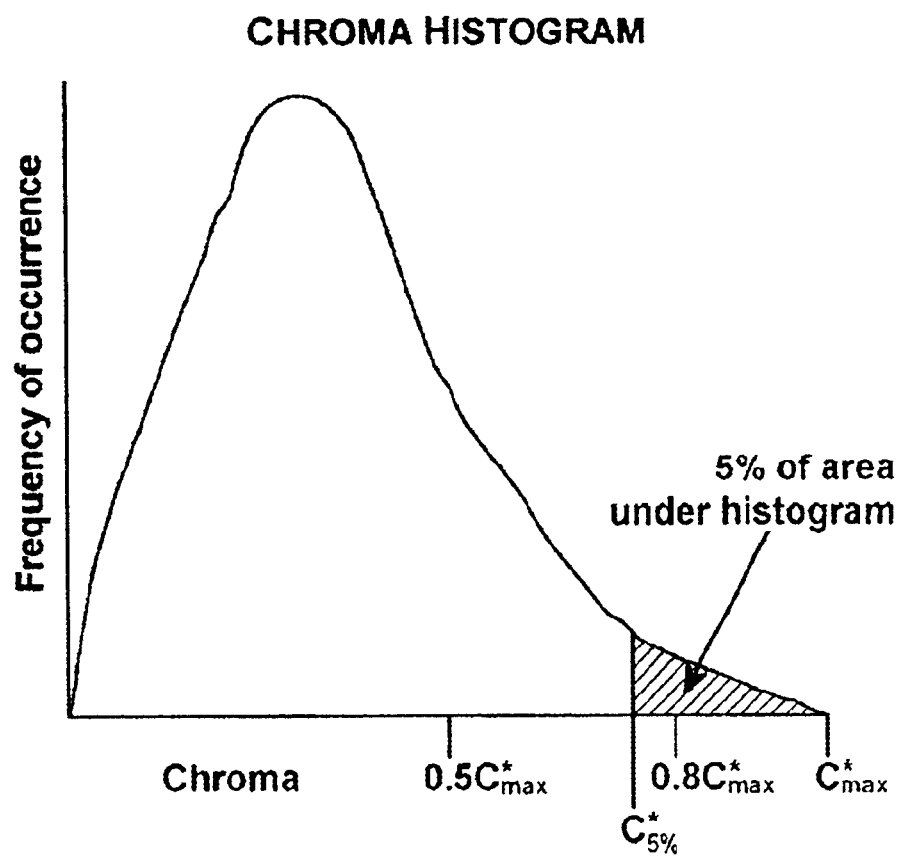
FIG. 1 is a graphic display of a chroma histogram.

This invention defines a system, apparatus, and software that operates on digital images. A digital image comprises a collection of picture elements or pixels arranged on a regular grid. A gray scale image is represented by a channel of specific brightness values at individual pixel locations. Such a channel may also be represented as a color palette, for example, containing 256 shades of gray. Gray scale images contain only achromatic colors, in other words those without a specific hue and with a zero saturation. A color image contains several channels, usual three or four, to describe the color at a pixel. For example, there may be red, green and blue (RGB) channels, or cyan, magenta, yellow and black (CMYK) channels. Each channel again contains brightness values representing the amount of color at each pixel. A color image may also be represented in palettized form. Such images contain chromatic colors, which possess both hue and saturation. The invention is concerned with adjustment of the saturation of such color images. It does not, however, depend in any way on the color representation used for the original image.

Regardless of the original color representation of the image, the invention is practiced in a chromaticity color space. Therefore, any original image must at some stage be provided in or converted to digital image data defined in a chromaticity color space. Such a color space has three dimensions, one of which corresponds at least approximately to the human perception of a property variously referred to as lightness or brightness or luminance or luma or value. Orthogonal to this dimension is a chrominance plane representing the chromatic component of color. Different directions from the lightness axis in the chrominance plane correspond to different color hues and distance from the lightness axis, at least approximately, related to the perceived saturation or vividness of the color. Such a color space may be represented in polar coordinates in which rotation about the lightness axis represents a hue angle or color phase, and distance from the hue axis represents saturation. The term saturation is often used very generally to mean colorfulness or vividness or strength or vibrancy of a color and this general use is intended here. Colorfulness is defined as the attribute of a visual sensation according to which an area appears to exhibit more or less of its hue. Formally, saturation is defined as colorfulness relative to brightness. A related concept is chroma, which is colorfulness relative to the brightness of a white. Any of these definitions are suitable for the practice and understanding of this invention.

Typically, images contain regions of various levels of saturation, ranging from vibrant colors to dull or even completely achromatic colors (e.g., grays). These various colors may occupy different sized regions of the image, so that sometimes dull colors dominate and other times bright colors dominate. This presents a problem in assessing what determines perception of the overall saturation of the image and, therefore, of the appropriateness of the saturation level. There is a general belief that perception of saturation is influenced by the spatial distribution of color but this matter is poorly understood. It is not clear whether high and low saturation regions need different treatment in the course of adjusting saturation. Conventional manual correction typically adjusts saturation in a linear fashion whereby all saturation values are multiplied by the same factor or, alternatively and less usually, adds a constant offset to the saturation values of the image. In such a situation the appropriateness of the saturation level is left to the judgement of the operator. There is no general agreement as to what image characteristic is responsible for an overall all sense of appropriate saturation of an image. For example, Inoue and Tajima assert in the previously cited reference that the maximum saturation value within the image determines the perception of overall saturation. However, U.S. Pat. No. 5,450,217 bases saturation correction on the average saturation within a certain value (i.e., lightness) bound. It is, therefore, a novel aspect of the present invention to provide a reliable means of characterizing overall image saturation, especially a means that permits establishing not only if an image is undersaturated but also if an image is oversaturated. A second novel aspect of the invention is the provision of a method to adjust saturation, including both increasing and reducing saturation, that provides consistent results over a broad range of imagery involving different distributions of saturation, including both images of properly high or properly low saturation. A third aspect of the invention is that both characterization and adjustment of saturation can be conducted in an automated manner. A fourth significant aspect of the invention is the provision of a method to adjust saturation according to specific subject matter in the image (e.g., skintones, sky colors, grass) either automatically or in a way that is capable of catering to different preferences with respect to saturation among various people. These and other aspects of the invention are achieved by defining a range of saturated colors, especially highly saturated colors, in a chromaticity color space and using the saturation of these colors, in conjunction with a table of corrections indexed by hue and lightness, to derive an overall correction for the saturation of colors in the image. The manner in which this may be done is explained more fully in the following.

The chromaticity space used for this invention may be a perceptual color space, in which small color differences of the same perceptual size are represented by approximately the same numerical distance in the color space. Examples of such color spaces are color difference systems such as the CIE L*u*v* and CIE L*a*b* color spaces as described in G. Wyszecki and W. S. Stiles, "Color Science—Concepts and Methods, Quantitative Data and Formulae", Wiley, N.Y., 1982. Other color suitable color spaces are color appearance systems such as those described in M. D. Fairchild, "Color Appearance Models", Prentice-Hall, New York, 1998. Examples include: the Nayatani color model (Y. Nayatani, *Color Res. and Appl.*, 20, 143 (1995)); the Hunt color model (R. W. G. Hunt, *Color Res. and Appl.*, 19, 23 (1994)); the LLAB color model (R. Luo, Proc. SPIE, 2658, 261 (1996)); the RLAB model (M. D. Fairchild, *Color Res. and Appl.*, 21, 338 (1996)); the ZLAB model (M. D. Fairchild, *Proceedings of the CIE Expert Symposium '97 on Colour Standards for Image Technology, CIE Pub.* x014, 89–94 (1998)); the IPT model (F. Ebner and M. D. Fairchild, *Proc.* 6th IS & T/SID *Color Imaging Conf.*, 8 (1998)); the ATD model (S. L. Guth, *Proc. SPIE*, 2414, 12 (1995)); the Granger adaptation of ATD as disclosed in U.S. Pat. No. 6,005,968; and the CIECAM97s model described in *CIE Pub.* 131 (1998). Additional useful color spaces include those that take spatial variation of color into account, such as S-CIELAB (X. Zhang and B. A. Wandell, *J. Soc. Information Display*, 5, 61 (1997)).

Color order systems are color spaces in which colors are arranged according to constant perceptual difference. Such color spaces may also be used for the practice of this invention. Examples of such color order systems include: the Munsell system (R. S. Berns and F. W. Billmeyer, *Color Res. and Appl.*, 21, 163 (1996)); the Optical Society of America Uniform Color Scale (D. L. MacAdam, *J. Opt. Soc. Am.*, 64, 1691 (1974)); the Swedish Natural Color System (*Swedish Standard* SS 0191 02 *Color Atlas, Second Ed.*, Swedish Standards Institution, Stockholm, 1989); http://www.ncscolour.com/); and the Deutches Institut fur Normung system (M. Richter and K. Witt, *Color Res. and Appl.*, 11, 138 (1984)).

While these perceptual color spaces are generally preferred for the practice of this invention, other color spaces may also be used. This is because the perceptual irregularities in the color space may be compensated by the table-based corrections to be described later. Additional color spaces include those used in television color standards, such as YIQ, YUV or $YC_bC_r$, the Xerox YES space, the Kodak PhotoYCC space, the Tektronix HVC (hue-value-chroma) color space, the HSV (hue-saturation-value) color space described by A. R. Smith, *Comput. Graph.*, 12, 12 (1978) and Lsα color space mentioned in WO 97/01151. Various computer graphics color spaces such as HLS (hue-lightness-saturation), HSL (hue-saturation-lightness), HSI (hue-saturation-intensity) or HSB (hue-saturation-brightness) may also be used. These spaces are described in J. Foley, A. van Dam, S. Feiner and J. Hughes, "Computer Graphics: Principles and Practice", Second Edition in C, Addison-Wesley, Reading, Mass., 1995.

Of the various color spaces the CIE L*u*v* and CIE L*a*b* color spaces are preferred since they offer sufficient accuracy in a simple implementation and are amenable to rapid color transformation from the original image space by use of a look-up table. Of these, CIE L*a*b* is especially preferred.

High saturation colors within the chromaticity space are preferably determined by means of a saturation or chroma histogram. The histogram is a frequency distribution of saturation or chroma for the pixels of interest in the image and measures the fraction of image pixels that fall within specific ranges of saturation or chroma. Such a histogram is illustrated in FIG. 1. High saturation pixels are those that lie in an interval between the highest saturation pixel in the image, $S_{max}$, and some lower bound. A preferred lower bound is from about $0.4S_{max}$ to about $S_{max}$ and a more preferred lower bound is from about $0.5S_{max}$ to about $0.9S_{max}$. An especially preferred lower bound is from about $0.5S_{max}$ to about $0.8S_{max}$. It is desirable and preferred to further restrict the location of the lower bound within the described limits. One way of doing so is to select as the lower bound that value of saturation above which lies a certain specific fraction of the most saturated pixels. A suitable fraction is from about 1% to about 20% and a preferred fraction is from about 2% to about 10%. An especially preferred fraction is about 5%. If the saturation corresponding to this fraction lies within the aforementioned limits on the lower bound of saturation, then this saturation may be taken as the lower bound of the high saturation region. Otherwise, the closer of the two limits to this saturation may be taken as the lower bound.

In forming the saturation or chroma histogram certain other measures may advantageously be taken. Since the contrast sensitivity function of the human eye falls off faster at high spatial frequencies for color than for lightness it may be advantageous to smooth the chrominance components in the spatial domain of the image. This is because high spatial frequencies in color are invisible to the eye but contribute noise, and hence error, to the histogram. Prior to forming the histogram the chrominance components may be smoothed by any method well known in the art, for example a Gaussian filter, and averaging filter or other low-pass filter. Suitable filters can be found in X. Zhang and B. A. Wandell, *J. Soc. Information Display*, 5, 61 (1997) and in the thesis of Marcus Nadenau, "Integration of Human Color Vision Models into High Quality Image Compression", Thesis No.2296, Département D'Électricité, École Polytechnique Fédérale de Lausanne, Switzerland (2000) (available from http://ltswww.epfl.ch/pub_files/nadenau/). Exact adherence to these recipes is not, however, required as the performance of the invention is relatively insensitive to this smoothing. For example, a 7 pixel by 7 pixel averaging window may be used in place of these specifications. Additionally, it may be desirable to omit from the histogram those pixels that have extremely low saturation, since these represent essentially achromatic colors that do not contribute to the perception of saturation. Because image color gamuts narrow at very low or very high lightness, such low saturation colors may, equivalently, be defined according to their lightness, since saturation is necessarily low at lightness extremes. It is preferred to exclude from the histogram colors of low lightness and high lightness, with exclusion of the former being especially preferred. Once high saturation colors have been defined in the histogram, possibly using the additional measures just described, estimation of the saturation correction may be based on these colors.

For every high-saturation color, an optimal value of saturation is considered to exist. Here, the term saturation is used generally and includes both chroma and the strict definition of saturation as chroma relative to lightness. In general, this optimal value depends not just on the initial value of the saturation but also on the hue and lightness of the color in question. While such an optimal value is most conveniently and rapidly retrieved from a table such as that shown in FIG. 2, it may also be represented by an equation or equations to be solved dynamically. The table may be constructed in any fashion provided it permits triplets of lightness, hue and saturation to be associated with each other. The table may be quantized into any convenient intervals of lightness, hue and saturation. These intervals may be uniform or non-uniform; uniform intervals are, however, preferred because accessing the table contents has a lower overhead. Entries in the table may all be different or some may be identical. The contents of the such optimal saturation tables may be derived by analysis of a range of well-saturated imagery or by analysis of saturation changes required to improve images with poor saturation or both. It is also within the scope of the invention to have multiple tables providing optimal saturation values. This permits some or all of the colors in the image to be handled specially, depending on the preferences of the operator. For example, while there may be one table providing an overall improvement of the saturation of all the image colors, other tables may provide more strongly or more weakly saturated colors to match the taste of the operator. Additionally, tables covering only certain restricted color ranges may be provided. For example, such tables may be tuned to provide especially excellent saturation for skin tones or to boost the saturation of sky or grass colors. The latter colors are often remembered as more saturated than they are in reality and boosting these colors can provide a more pleasing image at the expense of accuracy in scene reproduction. Such tables may be invoked at the operator's request or automatically. Automatic selection may, for example, be according to the fraction of pixels in the image that fall within the range of the color in question, or on the basis of the location or distribution or shape of the image region containing the color.

With the assistance of the table or tables an optimal saturation may be defined for each color in the high-saturation region. For any color, i, this relationship may be expressed in the form of a ratio, $R_i$, given by the equation:

$$R_i = A[(\text{Optimal Saturation})/(\text{Original Saturation})] + B$$

where A and B are constants. However, the relationship may also be expressed in other forms, for example such as this:

$$R_i = A \exp\{B[(\text{Optimal Saturation})/(\text{Original Saturation})] + C\}$$

where A, B and C are again constants. This latter representation is particularly preferred since it very significantly decreases erroneous correction of certain images at the expense of only slightly sub-optimal correction for others. Such ratios may be used directly to correct the saturation of individual colors. However, in the interest of improved reliability and robustness, it is preferred to combine these individual color ratios into a single ratio, R. The combination may be accomplished by any statistical method that derives a single measure descriptive of a distribution. For example, the mode or the median or the average may be used. The average is especially preferred, so that for n colors in the high saturation region of the saturation histogram:

$$R = \sum_{i=1}^{n} R_i / n$$

While it is possible to use such a composite value of R directly, it is preferred to place some additional constraints on the value of R. For example, R can be restricted to lie in a certain range to prevent excessive changes in saturation. A preferred range is from about 0.3 to about 4, and an especially preferred range is from about 0.7 to about 2. The absolute value of the maximum saturation in the image may also be taken into account.

This is desirable for preventing unwanted saturation changes in nearly achromatic images such as, for instance, sepia tone photographs or pastel wallpaper samples. In such a case, if the maximum saturation is less than a threshold, the value of K can be set to a predetermined number, for instance unity. A preferred threshold corresponds to a CIE L*a*b* chroma of about 10.

The constrained value of R can be used directly to adjust saturation, for example as a multiplier for the saturation values of all the image pixels of interest. This is a suitable approach when completely automatic operation is desired. However, when it is desired to provide for some operator interaction, for example to express different preferences or tastes in image appearance, an alternative formulation may be used. One illustrative embodiment is to express the saturation correction factor, F, as:

$$F = G \times R + H$$

where G is a multiplier and H is an offset, with one or both of G and H connected to operator-adjustable controls. F is a correction factor that multiplies the original saturation of the pixels of interest in the image. H may be thought of as providing a consistent bias towards higher saturation when positive and towards lower saturation when negative. G can be considered as strengthening the algorithmic correction if greater than unity and weakening it if less than unity. Other related embodiments will be evident to those skilled in the art.

Another aspect of the invention may be practiced as follows. Having selected an image to work the process of the invention upon, the program automatically detects the presence of predetermined (i.e., default) color ranges, such as, sky colors, grass colors, skintone colors, etc. as described above. All colors except these specified color ranges are corrected using the "normal" color table, while colors in (at least one of) these sub-regions (either automatically or operator selectable ranges) are corrected according to a table specific to the range. Typically, in the case of ordinary consumers, the intent in the correction to be provided by the table may be to oversaturate the color. We have enabled automatic detection of skintones in the examples. For example, in the practice of this method, the program can be designed so that if skintones are detected, then only skintones are corrected within the image and no other colors are modified. It is not trivial to automatically detect color ranges and seamless correct them. These programs enable manually selection of a range of color and correct them, using either this invention or manual means of color adjustment. The method can therefore be practiced wherein at least one color sub-range from the range of colors being corrected is automatically selected and corrected according to an associated table while at least some remaining colors in the range are corrected according to a second table.

Heretofore, the saturation correction has been described as a linear correction. Thus, when all the original saturation values are multiplied by the same factor the proportions between individual pixel saturation values are maintained after correction. However, the inventors appreciate that correction may also be performed in a non-linear fashion. This is particularly advantageous in the case of oversaturated images. In such images, the distinction between high saturation values has been eliminated by clipping at the image color gamut boundary and the variation of saturation within high-saturation regions has been permanently lost. When the high saturation of such images is correctly reduced, the image may nonetheless have an unnatural look. In such a situation the new saturation, $S'_i$, may be calculated from the original saturation, $S_i$, according to:

$$S'_i = F(S_i)^\gamma$$

Positive values of the exponent $\gamma$ that are greater than unity cause expansion of the high-saturation region in proportion to the low saturation region. Positive values less than unity cause expansion of the low-saturation region and are preferred for oversaturated images. For a $\gamma$ of unity the correction is linear. Other functional forms may also be adopted to handle specific image problems, for example mathematical functions that within at least a portion of their range create an S-shaped curve.

The invention is illustrated with respect to a specific embodiment. However, it will be appreciated that wide variation is possible within the scope of the invention as required by application needs so that this embodiment is exemplary and not limiting. For clarity, the embodiment is described as a series of steps. It will be understood by those skilled in the art, however, that the order of these steps may be changed and that steps may either be combined together into a single step or broken into a number of separate steps.

Step 1—Preparation of Color Information

The image is received as or converted to RGB color channels and converted into the CIE L*a*b* channels using a look-up table. Hue values, H*, are calculated, by way of non-limiting example only, according to:

$$H^* = 180 \arctan(b^*/a^*)/\pi; \text{ if } H^* < 0, H^* = H^* + 360$$

and chroma values, C*, are calculated, by way of non-limiting example only, according to;

$$C^* = ([a^*]^2 + [b^*]^2)^{0.5}$$

The chroma channel is smoothed with a 7 pixel by 7 pixel averaging window unless the image is smaller than the size of this filter kernel, in which case no smoothing is performed.

Step 2—Chroma Histogram Formation

For RGB channel pre-compensation with a gamma of 2.2 and for a D65 white point, the maximum chroma anywhere in the RGB gamut is 134. Accordingly, chroma histograms are constructed over a range of 0 to 134 in chroma using a 1 chroma unit bin size. Two histograms are constructed—a normal one and a skin tone histogram. The normal histogram is constructed from all chroma values of the pixels under consideration for which L* is not less than 15. The skin tone histogram is constructed from chroma values of the pixels under consideration that meet these criteria:

$$L^* \geq 15$$
$$5 \leq C^* \leq 55$$
$$10 \leq H^* \leq 70$$

and, therefore, includes only pixels typical of skin tone colors.

Step 3—Definition of High Chroma Colors

For each of the normal and skin tone chroma histograms a region is defined as containing high chroma colors. The upper bound of this region is the maximum chroma value in the histogram, $C^*_{max}$, as illustrated in FIG. 1. The lower bound $C^*_{low}$ is located at a chroma value, $C^*_{5\%}$, that delineates the top 5% of chroma values, subject to the constraint that the lower bound lie between chroma values of $0.5C^*_{max}$ and $0.8C^*_{max}$. Thus $C^*_{low}=\max(C^*_{5\%}, 0.5C^*_{max})$ and $C^*_{low}=\min(C^*_{5\%}, 0.8C^*_{max})$. Subsequent calculations are performed only on high chroma colors, i.e. those for which $C^*_{low} \leq C^* \leq C^*_{max}$.

Step 4—Calculation of Scale Factors

Overall image chroma scale factors are calculated separately for normal and skin tone colors. These are $SF_N$ and $SF_S$ respectively. If either of the histograms is empty, the corresponding overall image scale factor is set to unity. Similarly, if $C^*_{max}$ for either of these color categories is less than 10, the corresponding overall image scale factor is set to unity. Otherwise, these scale factors are calculated as follows. For every pixel, i, with a high chroma color, the chroma scale factor $SF_i$ may be computed according to:

$$SF_i = 2.3 \exp(-0.828\, C^*_i / C^*_{opt})$$

$C^*_{opt}$ is an optimum chroma obtained from a table indexed by lightness L* and hue H*. This table is shown as FIG. 2 for normal colors and FIG. 3 for skin tone colors. The $C^*_{opt}$ value is taken as the nearest in the table to that required, without any interpolation. The individual pixel scale factors, $SF_i$, for normal colors and for skin tones are averaged separately to give an overall values, $SF_N$ and $SF_S$ respectively, for the whole image. If either $SF_N$ or $SF_S$ lies outside the range 0.7 to 2.0 it is constrained to lie in this range.

Step 5—Calculation of Correction Factors

A correction factor for the chroma values of the image is calculated as follows. First, the target maximum chroma in the image, $C^*_{new,max}$, is computed from:

$$C^*_{new,max} = C^*_{old,max} \cdot SF + \text{Offset}$$

where is $C^*_{old,max}$ is the maximum chroma anywhere in the original image and SF is ether $SF_N$ or $SF_S$, as is explained below. Offset is an absolute offset for the chroma, optionally adjustable by the operator, with a default value of zero. A correction factor, F, for the chroma values in the image is now computed according to:

$$F = C^*_{new,max} / C^*_{old,max}$$

For general imagery the use of $SF_N$ in estimating the correction factor is preferred. However, if the image contains a significant number of pixels in the skin tone range it is hard to tell, in principle, whether the image is of an oversaturated face or an undersaturated red fire engine. In such a case it is desirable to give the operator an option to correct for skin tones by using $SF_S$ in the estimation of F. When skin tones are being corrected, only colors having L* ≥ 15, 5 ≤ C* ≤ 55, 10 ≤ H* ≤ 70 are modified, using $C^*_{opt}$ values from the skin tone table in FIG. 3. A suitable threshold for introducing the option of correcting with $SF_S$ is from about 0.5% to about 10% skin tone colors in the image, with a preferred value of about 1%. Even when the number of pixels in the skin tone category is less than the threshold it may, for consistency, be desirable to leave the operator with a skin tone correction option. In that case, however, the value of $SF_S$ may simply be estimated as:

$$SF_S = 0.5(1 + SF_N)$$

and used for all colors with $L^*_i \geq 15$.

Step 6—Correction of Chroma Values.

The improved chroma value of any pixel in the image, $C^*_{new,i}$, in terms of the original chroma value, $C^*_i$, is given by:

$$C^*_{new,i} = C^*_i \cdot F$$

In general the chroma correction afforded by this equation is excellent, particularly for natural scenes on which the tables in FIGS. 2 and 3 are primarily based. However, to allow for variation of personal taste among operators and to handle exotic computer-generated imagery it is desirable to provide the operator with an optional control to set the value of Offset. A suitable range for offset is from about −25 to +25 chroma units. A preferred range is from about −17 to about +17 chroma units. A generally satisfactory and especially preferred range is from about −14 to +14 chroma units. An alternative embodiment expresses the offset as:

$$\text{Offset} = \text{Bias} + \text{Strength}$$

where Bias is chosen from the values −11, 0 and +11 and, independently, Strength is chosen from the values −6, 0 and +6. In such a case, if either all Offset values increase chroma or all Offset values reduce chroma, it is desirable to ensure there exists at least one combination of settings that leaves chroma unchanged, preventing undesirable results with unusually pathological images. This can be done by recalculating $C^*_{new,max}$ as follows. If $C^*_{new,max} -$ Offset is greater than $C^*_{old,max}$, then $C^*_{new,max}$ is set to $C^*_{old,max} +$ Offset; otherwise if $C^*_{new,max} +$ Offset is less than $C^*_{old,max}$, then $C^*_{new,max}$ is set to $C^*_{old,max} -$ Offset. Finally, a new value of F is computed as in step 4. Following either automatic determination of the correction factor F or its adjustment by the operator's selection of an Offset value, all the chroma values of the pixels under consideration are corrected to improved values. Then, the new chroma values are combined with the original L* and H* values of the pixels and converted to L*, a* and b* values. Finally, the image is restored to RGB values by means of a look-up table.

What is claimed is:

1. A method of correcting image saturation by
    defining saturated colors in a chromaticity color space; and
    deriving an overall correction of the saturation of colors in the image using the defined saturation of these colors in conjunction with a table of corrections indexed by hue and lightness.

2. The method of claim 1 wherein the saturated colors are defined as a range of saturation.

3. The method of claim 2 wherein the range comprises saturation values for colors between a minimum and maximum limit of saturation.

4. The method of claim 3 where in the range comprises the saturation values of the most saturated colors in the image.

5. The method of claim 3 wherein a correction for overall saturation for a single color is determined, and that correction for a single color is used to direct correction for overall saturation for other colors.

6. The method of claim 1 acting upon an image containing data of oversaturated regions, and the method acting to automatically reducing saturation at least where some data of oversaturated regions exist within the image.

7. The method of claim 6 wherein the method conjointly acts to increase saturation in the image where the image contains data of oversaturated regions.

8. The method of claim 7 wherein a correction for overall saturation for a specific range of colors is determined, and then a correction for a single color within the specific range is used to direct correction for overall saturation for other colors.

9. The method of claim 7 wherein a correction for overall saturation for fewer than all colors is determined, and that correction for fewer than all colors is used to direct correction for overall saturation for other colors.

10. The method of claim 1 wherein a correction for overall saturation for a specific range of colors is determined, and then a correction for a single color within the specific range is used to direct correction for overall saturation for other colors.

11. The method of claim 1 wherein a correction for overall saturation for a single color is determined, and that correction for a single color is used to direct correction for overall saturation for other colors.

12. The method of claim 1 wherein a correction for overall saturation for fewer than all colors is determined, and that correction for fewer than all colors is used to direct correction for overall saturation for other colors.

13. The method of claim 12 wherein the reference histogram comprises a histogram of frequency distribution of saturation or chroma for pixels of interest in the image and the reference histogram measures a fraction of image pixels that fall within specific ranges of saturation or chroma.

14. The method of claim 13 wherein the lower level of saturation is from about $0.5 S_{max}$ to about $0.9 S_{max}$.

15. The method of claim 1 wherein high saturation colors within the chromaticity space are determined by reference to a saturation histogram or chroma histogram.

16. The method of claim 15 wherein the lower level of saturation is from about $0.4 S_{max}$ to about $S_{max}$.

17. The method of claim 1 wherein high saturation pixels are selected for correction as those pixels that lie in an interval between a highest saturation pixel in the image, $S_{max}$, and a lower level of saturation in the image.

18. The method of claim 1 wherein a correction factor for chroma values of the image is calculated by computing a target maximum chroma in the image, $C^*_{new,max}$, from:

$$C^*_{new,max} = C^*_{old,max} \cdot SF + \text{Offset}$$

where is $C^*_{old,max}$ is maximum chroma anywhere in the original image and SF is ether $SF_N$ or $SF_S$, Offset is an absolute offset for the chroma, optionally adjustable by the operator, with a default value of zero, wherein $SF_N$ and $SF_S$ are overall image chroma scale factors calculated separately for normal and skin tone colors, respectively.

19. The method of claim 1 wherein skintones are corrected separately and differently from the correction of other colors.

20. The method of claim 1 wherein at least one region of the image is treated with specific, operator-selectable color ranges and the correction within that region is different from correction of at least one other region of the image.

21. A computer having software in its memory that is capable of executing the method of claim 1.

22. The method of claim 1 wherein at least one region of the image is treated with specific, automatically selected color ranges and the correction within that region is different from correction of at least one other region of the image.

23. The method of claim 1 wherein at least one color sub-range from the range of colors being corrected is automatically selected and corrected according to an associated table while at least some remaining colors in the range of colors being selected are corrected according to a second table.

24. A method of correcting image saturation by
defining saturated colors in a chromaticity color space; and
deriving an overall correction of the saturation of colors in the image using the defined saturation of these colors by referencing a table of corrections relating values of saturation, hue and lightness.

25. The method of claim 24 wherein values of saturation are provided as values of saturation desired for values of hue and lightness.

26. The method of claim 25 wherein a correction for overall saturation for a single color is determined, and that correction for a single color is used to direct correction for overall saturation for other colors.

27. The method of claim 24 wherein a correction for overall saturation for a single color is determined, and that correction for a single color is used to direct correction for overall saturation for other colors.

28. A computer having software in its memory that is capable of executing the method of claim 24.

* * * * *